(12) United States Patent       (10) Patent No.:     US 9,325,902 B2
Yoshida                          (45) Date of Patent:    Apr. 26, 2016

(54) IMAGE CAPTURING APPARATUS AND CONTROL METHOD THEREFOR

(71) Applicant: CANON KABUSHIKI KAISHA, Tokyo (JP)

(72) Inventor: Koji Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 13/892,725

(22) Filed: May 13, 2013

(65) Prior Publication Data

US 2013/0329110 A1    Dec. 12, 2013

(30) Foreign Application Priority Data

Jun. 8, 2012  (JP) .................................. 2012-131395

(51) Int. Cl.
*H04N 5/232* (2006.01)

(52) U.S. Cl.
CPC ....... *H04N 5/23293* (2013.01); *H04N 5/23222* (2013.01)

(58) Field of Classification Search
CPC ....................... H04N 5/23293; H04N 5/23245
See application file for complete search history.

(56) References Cited

U.S. PATENT DOCUMENTS

| 5,678,082 | A  | * | 10/1997 | Miyazawa et al. ............. 396/300 |
| 7,683,958 | B1 | * | 3/2010  | Chen et al. ............... 348/333.01 |
| 2007/0153112 | A1 | * | 7/2007 | Ueda et al. ..................... 348/335 |
| 2007/0276513 | A1 | * | 11/2007 | Sudo ................................. 700/75 |
| 2009/0290047 | A1 | * | 11/2009 | Sogoh et al. .............. 348/240.99 |
| 2010/0296806 | A1 | * | 11/2010 | Seo et al. ....................... 396/236 |

FOREIGN PATENT DOCUMENTS

| JP | 2001-177741 A | 6/2001 |
| JP | 2005-167701 A | 6/2005 |
| JP | 2006-033752 A | 2/2006 |
| JP | 2007-243923 A | 9/2007 |
| JP | 2008-311724 A | 12/2008 |
| JP | 2010-245810 A | 10/2010 |

* cited by examiner

*Primary Examiner* — Timothy J Henn

(74) *Attorney, Agent, or Firm* — Cowan, Liebowitz & Latman, P.C.

(57) ABSTRACT

An image capturing apparatus comprises a unit which accepts a switching operation of switching a display mode, a display switching unit which switches, in response to the switching operation, to a next display mode in a predetermined order from a plurality of display modes including a first display mode wherein a live view image is displayed on a display unit, a second display mode, different from the first mode, wherein a live view image is displayed, and a third display mode wherein no live view image is displayed, a unit which accepts a shooting preparation instruction, and a unit which controls, upon accepting the shooting preparation instruction when the display mode is the third display mode, to switch the display mode from the third display mode to the second display mode.

13 Claims, 5 Drawing Sheets

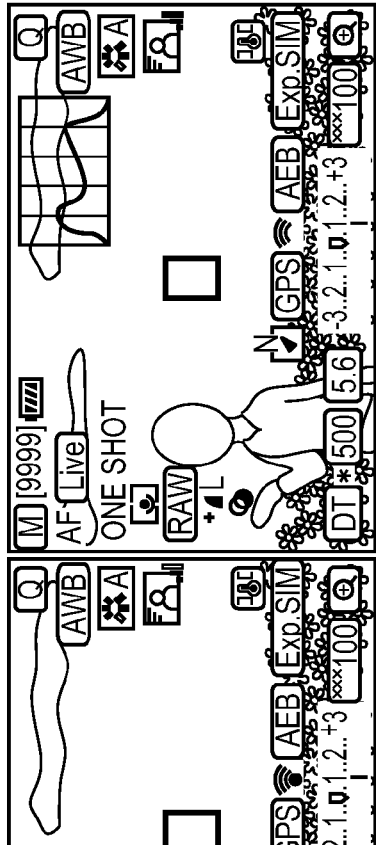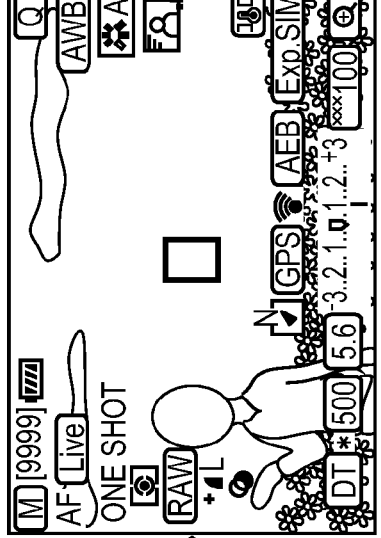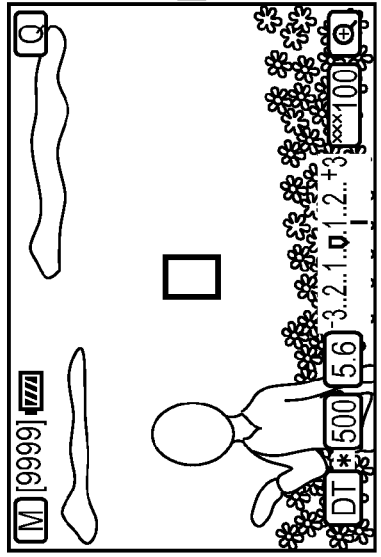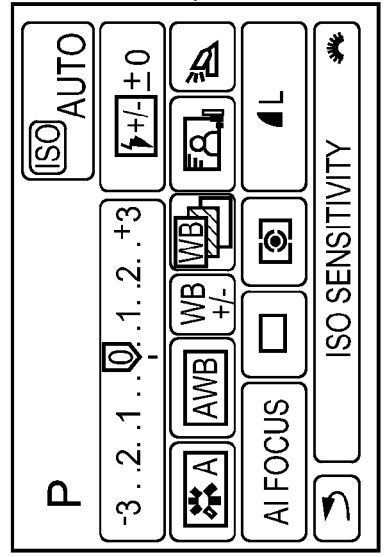

IMAGE CAPTURING APPARATUS AND CONTROL METHOD THEREFOR

BACKGROUND OF THE INVENTION

1. Field of the Invention

The present invention relates to an image capturing apparatus and a control method therefor and, more particularly, to a technique of switching a display mode during shooting standby.

2. Description of the Related Art

There is conventionally known an image capturing apparatus which transits to a shooting standby state wherein a through-the lens-image (live view image) is displayed in response to halfway press of a shutter button during a playback mode or display of a setting menu or the like. Japanese Patent Laid-Open No. 2006-33752 proposes an image capturing apparatus which ceases to display a playback image or setting menu, displays a through-the lens-image on a display unit, and transits to a shooting standby state, in response to halfway or full press of a release button in a playback mode or setup mode.

On the other hand, there is known an image capturing apparatus which superimposes and displays information of currently set shooting conditions or information for supporting a shooting operation on a through-the lens-image displayed in a shooting standby state. Japanese Patent Laid-Open No. 2007-243923 discloses a technique of switching, in response to the operation of a single operation member, a display mode from a plurality of display modes for which information superimposed and displayed on a through-the lens-image is different.

Consider a case in which there is a display mode wherein a number of pieces of setting information are displayed without displaying a through-the lens-image (live view image) as one of a plurality of display modes in a shooting standby state like Japanese Patent Laid-Open No. 2007-243923, in addition to the playback mode and setup menu in Japanese Patent Laid-Open No. 2006-33752. In this case, if the user cannot check the composition by watching a through-the lens-image before giving a shooting instruction by, for example, fully pressing the shutter button after giving a shooting preparation instruction by, for example, pressing the shutter button halfway, it becomes difficult to perform shooting with a composition intended by the user, thereby impairing the usability. Japanese Patent Laid-Open No. 2006-33752, however, only discloses a technique in which the apparatus transits to a shooting standby state when the release button is operated while the apparatus is not in the shooting standby state. That is, the technique disclosed in Japanese Patent Laid-Open No. 2006-33752 does not consider control when the release button is operated in the display mode wherein no through-the lens-image is displayed even though the apparatus is in the shooting standby state.

SUMMARY OF THE INVENTION

The present invention has been made in consideration of the aforementioned problems, and realizes a technique in which the user can check the composition by watching live view display before giving a shooting instruction even if a shooting preparation instruction is given in a shooting standby state and in a display mode wherein no live view display is performed.

In order to solve the aforementioned problems, the present invention provides an image capturing apparatus comprising: an image capturing unit; an operation unit configured to accept a switching operation of switching a display mode; a display mode switching unit configured to switch, in response to the switching operation, to a next display mode in a predetermined order from a plurality of display modes including a first display mode wherein a live view image is displayed on a display unit, a second display mode, different from the first display mode, wherein a live view image is displayed on the display unit, and a third display mode wherein no live view image is displayed on the display unit; an acceptance unit configured to accept a shooting preparation instruction; and a control unit configured to control, upon accepting the shooting preparation instruction when the display mode is the third display mode, the display mode switching unit to switch the display mode from the third display mode to the second display mode.

In order to solve the aforementioned problems, the present invention provides a control method of an image capturing apparatus having an image capturing unit, an operation unit configured to accept a switching operation of switching a display mode, and an acceptance unit configured to accept a shooting preparation instruction, the method comprising: a mode switching step of switching, in response to the switching operation, to a next display mode in a predetermined order from a plurality of display modes including a first display mode wherein a live view image is displayed on a display unit, a second display mode, different from the first display mode, wherein a live view image is displayed on the display unit, and a third display mode wherein no live view image is displayed on the display unit, wherein in the mode switching step, upon accepting the shooting preparation instruction when the display mode is the third display mode, the display mode is switched from the third display mode to the second display mode.

According to the present invention, if a shooting preparation instruction is given in a third display mode wherein no live view display is performed, the third display mode is switched to a display mode wherein live view display is performed before a shooting preparation operation is executed, thereby enabling the user to check an object before shooting.

Further features of the present invention will become apparent from the following description of exemplary embodiments (with reference to the attached drawings).

BRIEF DESCRIPTION OF THE DRAWINGS

FIGS. 4A, 4B-1, 4B-2, 4C, and 4D are views each showing a display example in the mode switching operation according to the embodiment.

DESCRIPTION OF THE EMBODIMENTS

An embodiment of the present invention will be described below with reference to the accompanying drawings.

<Apparatus Configuration>

The configuration and function of a digital camera to which an image capturing apparatus according to the present invention is applied will be explained with reference to FIGS. 1 and 2.

Figure 1:
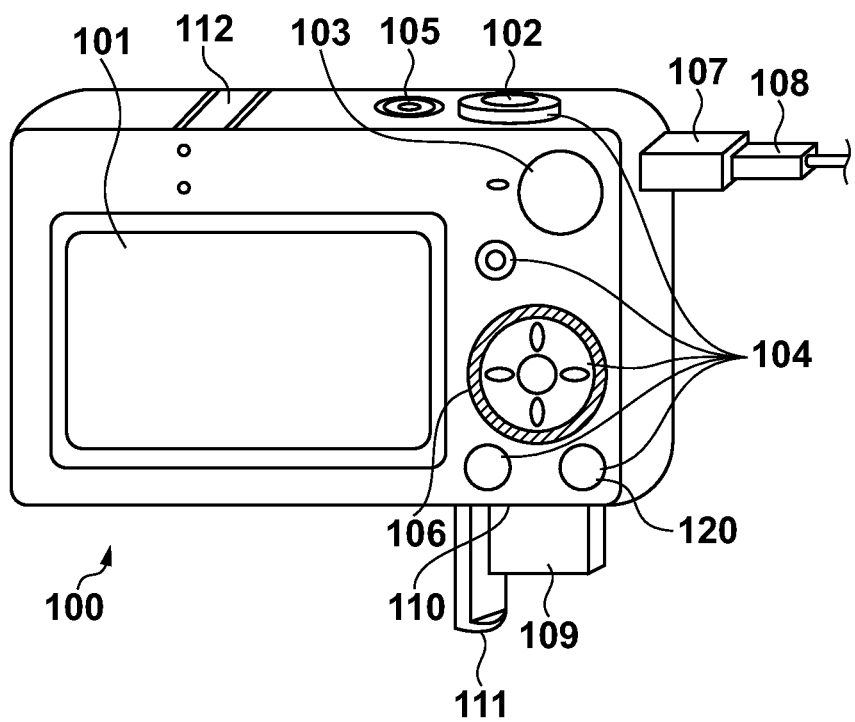
FIG. 1 is a view showing the outer appearance of an image capturing apparatus according to an embodiment of the present invention.

FIG. 1 shows the outer appearance of a digital camera (to be simply referred to as a camera hereinafter) 100 according to the embodiment. In FIG. 1, reference numeral 101 denotes a display unit such as an LCD panel which displays a shot image or various kinds of information to be visually perceivable by the user; 102, a shutter button which is used by the user to give a shooting instruction; 103, a mode switching button which is used by the user to switch between various modes; and 104, operation units such as various switches, buttons, and a touch panel which are used to accept various operations by the user. An INFO button 120 included in the operation units 104 is an operation member for switching a display mode. Every time the user presses the INFO button 120, the current display mode can be sequentially switched. Reference numeral 106 denotes a touch wheel which is included in the operation units 104, and can be used by the user to perform a touch operation. The touch wheel 106 is used to, for example, instruct a selection item together with a direction button. The touch wheel 106 is an operation member constituted by a touch sensor, and does not rotate but detects a rotation operation of a finger of the user and the like on itself. Reference numeral 105 denotes a power switch for switching, by the user, ON/OFF of a power supply; 107, a connector for connecting the camera 100 with an external device (PC, television set, or the like) by a cable 108; 109, a recording medium such as a memory card or hard disk; and 110, a slot for storing the recording medium 109. The recording medium 109 stored in the slot 110 can communicate with the camera 100. Reference numeral 111 denotes a cover for opening or closing the slot 110.

Furthermore, reference numeral 112 denotes an attachment unit to which various accessories are attached and which includes a communication unit for transmitting/receiving data to/from an accessory and an attachment/detachment detection unit capable of detecting the presence/absence of attachment. An example of an attachable accessory is an external electronic view finder (EVF). If the user looks into the external EVF, he/she can check a still image or moving image captured by an image capturing unit through a lens.

Figure 2:
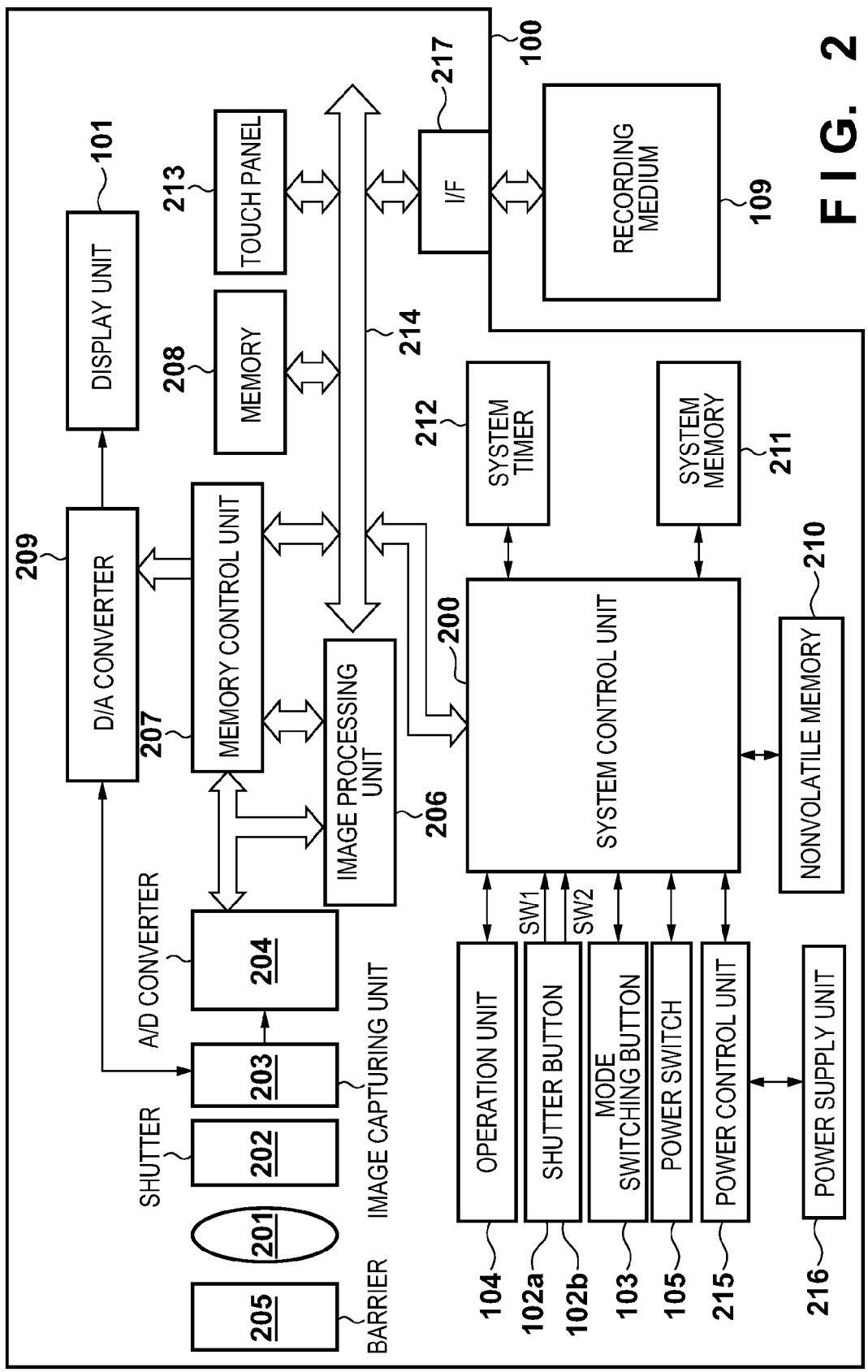
FIG. 2 is a block diagram showing the image capturing apparatus according to the embodiment.

FIG. 2 is a block diagram exemplifying the configuration of the digital camera 100 according to this embodiment. In FIG. 2, a photographing lens 201 includes a zoom lens and a focusing lens. A shutter 202 has a diaphragm function. An image capturing unit 203 is an image sensor, which is constituted by a CCD or CMOS or the like, for converting the optical image of a subject to an electric signal. An A/D converter 204 converts an analog signal to a digital signal. The A/D converter 204 is used to convert an analog signal, which is output from the image capturing unit 203, to a digital signal. A barrier 205 covers the image capturing system (which includes the photographing lens 201) of the digital camera 100, thereby preventing contamination of and damage to the image capturing system that includes the photographing lens 201, shutter 202 and image capturing unit 203.

An image processing unit 206 performs resizing processing, such as predetermined pixel interpolation and reduction, and color conversion processing, with respect to data from the A/D converter 204 or data from a memory control unit 207. Further, the image processing unit 206 performs predetermined calculation processing using the captured image data, and the system control unit 200 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 206 performs predetermined calculation processing using the captured image data, and AWB (Automatic White Balance) processing of TTL type is performed on the basis of the calculation results.

The data from the A/D converter 204 is directly written into a memory 208 via both the image processing unit 206 and the memory control unit 207 or via the memory control unit 207. The memory 208 stores the image data obtained from the image capturing unit 203 and the A/D converter 204, and image display data to be displayed on the display unit 101. The memory 208 has a storage capacity that is sufficient for storing a predetermined number of still images as well as moving images and audio for a predetermined time period.

The memory 208 also functions as a memory for image display (video memory). A D/A converter 209 converts the image display data stored in the memory 208 into an analog signal and applies the display unit 101 with the analog signal. The image display data that was written into the memory 208 is displayed by the display unit 101 via the D/A converter 209. The display unit 101 performs, on a display device such as an LCD, display in accordance with the analog signal from the D/A converter 209. A predetermined signal processing of the analog signal once converted by the A/D converter 204 and stored in the memory 208 is performed by the image processing unit 206 and then stored in the memory 208. In this manner, the digital signals stored in the memory 208 are converted into analog signals, and the analog signals are successively transmitted to the display unit 101 so as to be displayed thereon, making it possible to realize an electronic view finder (EVF) functionality and to perform through image display (live view display).

A nonvolatile memory 210 is, for example, an EEPROM, which is electrically erasable and recordable. In the nonvolatile memory 210, constants and programs, for example, for operating the system control unit 200 are stored. In this context, "programs" may refer to programs for executing flowcharts in FIGS. 3A and 3B that will be described later.

The system control unit 200 is a calculation processing device for overall controlling the entire camera 100, and realizes, by executing the programs stored in the nonvolatile memory 210, the procedures of the flowchart that will be described later. The system memory 211 is, for example, a RAM and used also as a work memory where constants and variables for operating the system control unit 200, and the programs read out from the nonvolatile memory 210 are expanded. The system control unit 200 controls the memory 208, the D/A converter 209, the display unit 101, and the like, so as to perform display control. A system timer 212 is a timer circuit for measuring time periods for various types of controls and the time of an integrated clock.

A mode switching button 103, a first shutter switch 102a, a second shutter switch 102b, and the operation units 104 are operation members for inputting various types of instructions into the system control unit 200. The mode switching button 103 switches the operation mode of the system control unit 200 to any of a still image recording mode, a moving image recording mode, and a reproduction mode. The still image recording mode includes an automatic shooting mode, an automatic scene determination mode, a manual mode, various types of scene modes in which different settings are configured for individual shooting scenes, a program AE mode, a custom mode, and the like. Using the mode switching button 103, the mode is directly switched to any of the plurality of modes included in the still image recording mode. Alternatively, it is also possible to switch, using the mode switching button 103, to the still image recording mode and then to switch, using another operation member, to any of the plurality of modes included in the still image shooting mode. Similarly, also the moving image shooting mode may include a plurality of modes.

While the shutter button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 200 causes the image processing unit 206 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system control unit 200 starts a series of shooting processing from reading out the signal from the image capturing unit 203 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button. For example, a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

Every time the INFO button 120 included in the operation units 104 is pressed, the display mode is sequentially switched. That is, if the current display mode is display mode 1, it is switched to display mode 2. If the current display mode is display mode 2, it is switched to display mode 3. If the current display mode is display mode 3, it is switched to display mode 4. If the current display mode is display mode 4, it is switched to display mode 1. Information displayed in each display mode will be described later with reference to FIGS. 4A to 4D.

Included among the operation units 104 is also a touch panel 213 as a touch detecting unit capable of detecting a touch operation on the display unit 101. The touch panel 213 and the display unit 101 can be constructed as a single integrated unit. For example, the touch panel 213 is constructed in such a manner that the transmittance of light will not interfere with the display presented by the display unit 101, and it is attached to the uppermost layer of the display face of the display unit 101. In addition, input coordinates on the touch panel 213 and display coordinates on the display unit 101 are correlated. As a result, a GUI can be constructed that makes it possible for the user to directly manipulate the screen displayed on the display unit 101.

The system control unit 200 is capable of detecting the following operations performed by contacting the touch panel 213: touching of the panel 213 using a finger or pen (referred to as "touch-down" below); a state in which the touch panel 213 is in contact with a finger or pen (referred to as "touch-on" below); movement of a finger or pen while in contact with the touch panel 213 (referred to as "move" below); lifting of a finger or pen that has been in contact with the touch panel 213 (referred to as "touch-up" below); and a state in which the touch panel 213 is not being touched at all (referred to as "touch-off" below). These operations and position coordinates at which the touch panel 213 is being touched by the finger or pen are communicated to the system control unit 200 through an internal bus 214 and, based upon the information thus communicated, the system control unit 200 determines what kind of operation was performed on the touch panel 213. As for "move", the determination can be made also for every vertical component and horizontal component with regard to the direction of movement of the finger or pen, which is moved on the touch panel 213, based upon a change in the coordinate position. Further, it is assumed that a stroke has been made when "touch-up" is performed following a regular "move" after a "touch-down" on the touch panel 213. A very quick stroke action is referred to as a "flick". A "flick" is an operation in which, with fingers in contact with the touch panel 213, the fingers are moved rapidly over a certain distance and then lifted. In other words, this is a rapid tracing operation in which the fingers are flicked across the surface of the touch panel 213. The system control unit 200 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed. It should be noted that the touch panel 213 may employ a method that relies upon any of the following: resistive film, electrostatic capacitance, surface acoustic waves, infrared radiation, electromagnetic induction, image recognition and optical sensing.

If the user performs a touch operation for the touch wheel 106 shown in FIG. 1, an electrical pulse signal is generated according to the touch operation, and the system control unit 200 controls each unit of the camera 100 based on the generated pulse signal. Based on the pulse signal, it is possible to determine a direction in which the touch operation of the touch wheel 106 has been performed, the number of rotation operations, and the like. Note that any operation member may be used as the touch wheel 106 as long as a touch operation can be detected.

A power control unit 215 is constituted by, for example, a battery detection circuit, a DC-DC converter, a switch circuit for changing over the block to be supplied with power, and detects a battery has been inserted or not, the type of the battery, and the residual capacity thereof. Further, the power control unit 215 controls the DC-DC converter in accordance with the detection results and an instruction of the system control unit 200, and supplies a necessary voltage for a necessary length of time to each of the units including the recording medium 109.

A power supply unit 216 comprises a primary battery such as an alkaline battery or a lithium battery, a secondary battery such as an NiCd battery, an NiMH battery, or an Li battery, or an AC adaptor. The recording medium interface (I/F) 217 is for interfacing with the recording medium 109 such as the memory card or hard disk. The recording medium 109 is a recording medium such as a memory card for recording shot images, and constituted by a semiconductor memory, a magnetic disk, or the like.

Display Example

Examples of display of the display unit 101 in display modes 1 to 4 will be described with reference to FIGS. 4A to 4D.

FIG. 4A shows a display example in display mode 1 as a first display mode. A currently set shooting mode (an icon at the upper leftmost position which indicates a manual mode in the example of FIG. 4A), the number of recordable images (the second information from the left in an upper portion which indicates that 9999 images can be shot in the example of FIG. 4A), and a remaining battery level (the third icon from the left in the upper portion) are superimposed and displayed on a through-the lens-image (live view image) displayed in the background. Shooting conditions such as the current F value (an aperture value indicated by a numerical value within the third rectangle from the left in a lower portion, which is 5.6 in the example of FIG. 4A), exposure correction (fourth information from the left in the lower portion), and ISO sensitivity (the fifth information from the left in the lower portion) are also displayed.

FIG. 4B-1 shows a display example in display mode 2 as a second display mode. The number of information items superimposed and displayed on a through-the lens-image (live view image) displayed in the background is larger than that in display mode 1. A white balance setting value (the second icon from the top in a right portion) and the like are additionally displayed, as compared with FIG. 4A.

FIG. 4B-2 shows a display example in display mode 2 if histogram display has been turned on through a menu screen. This example is the same as that shown in FIG. 4B-1 except that a histogram is displayed.

FIG. 4C shows a display example in display mode 3 as a third display mode. In display mode 3, only an AF frame and a warning for high temperature of the image capturing unit (an icon on the right side of the screen, which is displayed only when the temperature increases) are superimposed and displayed on a through-the lens-image (live view image) displayed in the background, and no other information is displayed. Display mode 3 is a display mode in which the number of displayed information items is smallest among display modes 1 to 4. In display mode 3, therefore, the number of items which disturb visual perception of the live view image is small and thus it is easy to watch a live view.

FIG. 4D is a display example in display mode 4 as a fourth display mode. In display mode 4, a display screen imitating the display screen of a single-lens reflex digital camera including an optical finder in a shooting setting state is displayed, on which a number of pieces of information are tiled and displayed. A live view image is not displayed, and thus a region where each piece of information is displayed is wider than that where the same information is displayed in other display modes. Therefore, the visibility of each piece of information is high and it is easy to perform a touch operation for a region where each piece of information is displayed. If a touch operation is performed for a region where each piece of information is displayed, it is possible to change the setting of a setting item displayed in the touched region. Unlike a menu screen displayed when a menu button is pressed, display mode 4 is a type of display mode in the shooting standby state, which can be switched by the INFO button 120. Note that if the current display mode is display mode 3 in the shooting standby state, and the INFO button 120 is pressed, the display mode is switched to display mode 4. However, even if the INFO button 120 is pressed during recording of a moving image, the display mode is not switched from display mode 3 to display mode 4 but switched to display mode 1.

<Mode Switching Operation>

A mode switching operation by the digital camera according to the embodiment will be described with reference to FIGS. 3A and 3B. Note that processing shown in FIGS. 3A and 3B is implemented when the system control unit 200 reads out, into the system memory 211, a program recorded in the nonvolatile memory 210, and executes it.

Figure 3A:
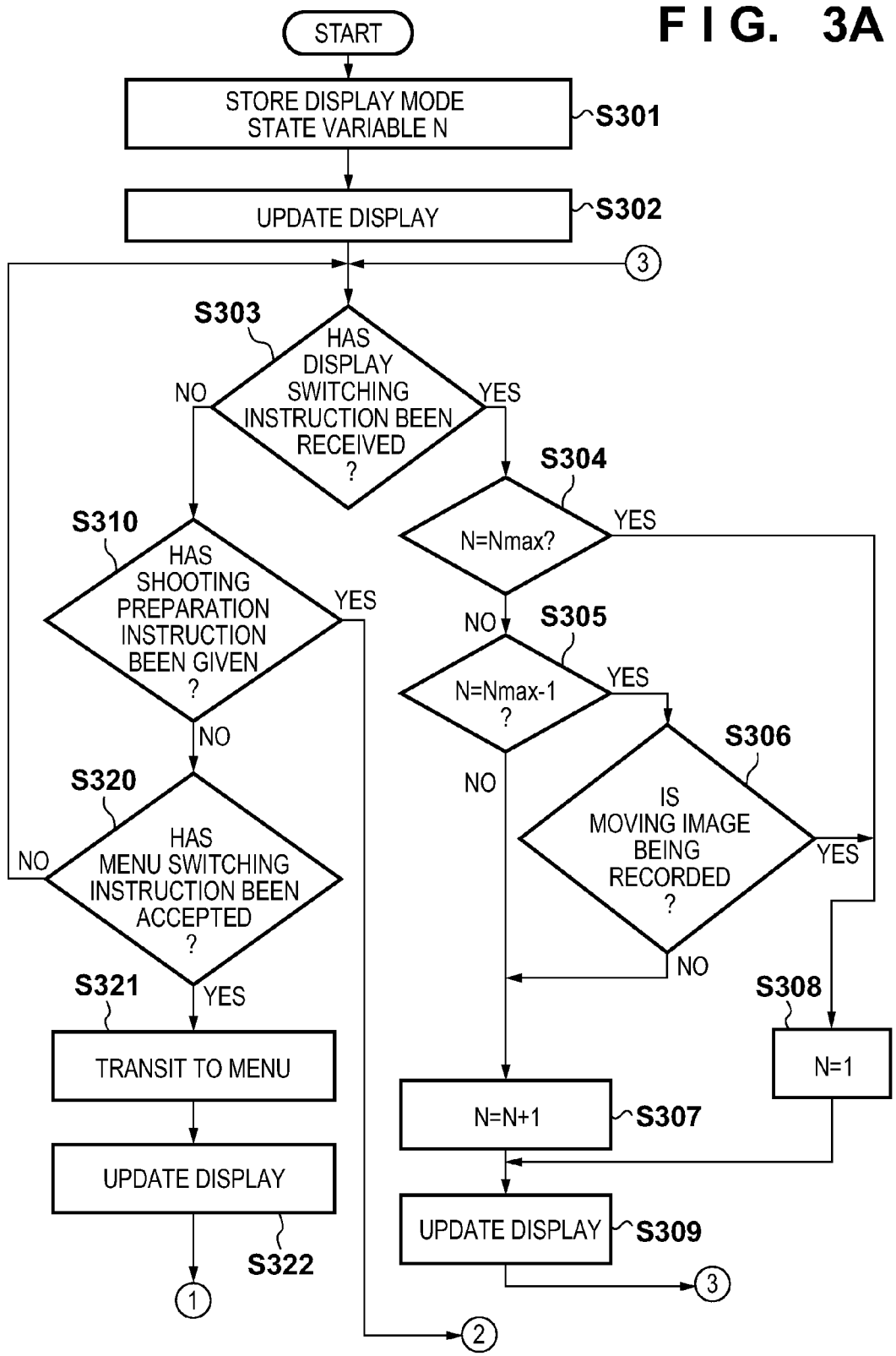
FIGS. 3A and 3B are flowcharts illustrating a mode switching operation according to the embodiment.
Figure 3B:
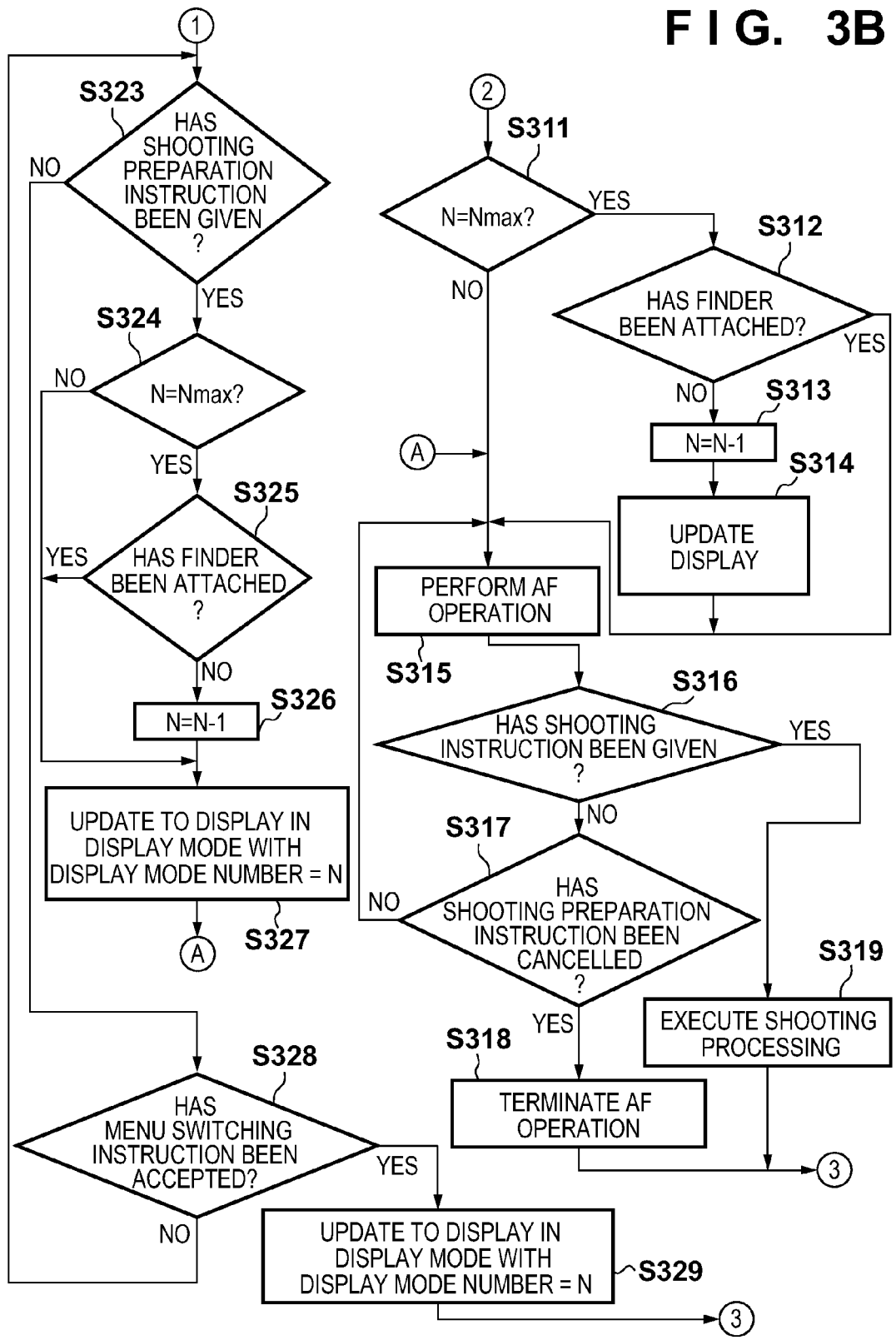

Referring to FIGS. 3A and 3B, when the system control unit 200 receives, from the operation unit 104, an instruction to start activation of the camera 100 in a shooting mode, the process starts. In step S301, a state variable N of the current display mode is stored in the system memory 211. The state variable N corresponds to the above-described display mode number. That is, N=1 corresponds to display mode 1; N=2, display mode 2; N=3, display mode 3; and N=4, display mode 4.

In step S302, the system control unit 200 updates display of the display unit 101 according to the display mode state variable N stored in the system memory 211.

In step S303, the system control unit 200 determines whether an instruction to switch to a display mode in its turn in a predetermined order has been received from the operation unit 104. If it is determined that an instruction to switch to a display mode in its turn in the predetermined order has not been received, and thus display in the current display mode is to continue, the process advances to step S310. On the other hand, if an instruction to switch to a display mode in its turn in the predetermined order has been received, and thus display in the display mode is to be switched, the process advances to step S304.

In step S304, the system control unit 200 determines whether the display mode state variable N stored in the system memory 211 is equal to a maximum value $N_{max}$ assumed by the camera 100. In this embodiment, there are four display modes, and thus the maximum value is 4. That is, this determination processing determines whether the current display mode is display mode 4 wherein no live view display is performed. If it is determined that the display mode state variable N is not equal to the maximum value $N_{max}$ assumed by the camera 100, the process advances to step S305; otherwise, the process advances to step S308.

In step S305, the system control unit 200 determines whether the display mode state variable N stored in the system memory 211 is equal to a value obtained by subtracting 1 from the maximum value $N_{max}$ assumed by the camera 100, that is, whether the current display mode is display mode 3. If it is determined that the display mode state variable N is not equal to (maximum value $N_{max}$−1) (4−1=3), the process advances to step S307; otherwise, the process advances to step S306.

In step S306, the system control unit 200 determines whether a moving image is being recorded. If it is determined that no moving image is being recorded, the process advances to step S307; otherwise, the process advances to step S308.

In step S307, the system control unit 200 increments the value of the display mode state variable N stored in the system memory 211 by one.

In step S308, the system control unit 200 sets 1 in the display mode state variable N stored in the system memory 211. While a moving image is being recorded, the display mode is not switched to display mode 4 wherein no live view display is performed so that the user can always check an object.

In step S309, the system control unit 200 updates display of the display unit 101 according to the display mode state variable N stored in the system memory 211. Upon updating the display, the process returns to step S303.

In step S310, the system control unit 200 determines whether the shutter button 102 has been pressed halfway to turn on the first shutter switch 102a and then the first shutter switch signal SW1 has been generated, that is, whether a shooting preparation instruction has been given. This processing corresponds to an example of processing by a shooting preparation instruction detection unit. If the first shutter switch signal SW1 has not been generated, the process advances to step S320; otherwise, the process advances to step S311.

In step S311, the system control unit 200 determines whether the display mode state variable N stored in the system memory 211 is equal to the maximum value $N_{max}$. If it is determined that the display mode state variable N is not equal to the maximum value $N_{max}$ assumed by the camera 100, the process advances to step S315; otherwise, the process advances to step S312.

In step S312, the system control unit 200 determines whether an external finder has been attached to the attachment unit 112. This determination processing determines whether an external optical finder such as the above-described external EVF has been attached. If it is determined that a finder has been attached to the camera 100, the process advances to step S315; otherwise, the process advances to step S313.

In step S313, the system control unit 200 decrements the value of the display mode state variable N stored in the system memory 211 by one. With this operation, if a shooting preparation instruction is received in display mode 4 wherein no live view display is performed, the display mode is switched to display mode 3 wherein live view display is performed. This enables the user to check the composition by watching a live view image before giving a shooting instruction by fully pressing the shutter button 102, and perform appropriate framing, thereby executing shooting at an arbitrary shutter timing according to the object. This operation is considered as an operation after checking and setting various kinds of detailed information such as shooting settings in display mode 4. Therefore, the display mode is switched to display mode 3 wherein a smallest number of unnecessary pieces of information are displayed and live view display is most easily, visually perceivable. Furthermore, after giving a shooting instruction, the user often desires to switch the display mode to display mode 4 again. In the display mode switching order, display mode 3 wherein a smallest number of pieces of information are displayed and a live view image is easily, visually perceivable is followed by display mode 4 wherein no live view display is performed. With this order, it is possible to switch the display mode from display mode 4 wherein no live view display is performed to display mode 3 wherein live view display is most easily, visually perceivable in response to a shooting preparation instruction. After that, it is possible to return to display mode 4 by only pressing the INFO button 120 once, that is, by one touch.

In step S314, the system control unit 200 updates display of the display unit 101 according to the display mode state variable N stored in the system memory 211.

In step S315, the system control unit 200 performs an AF operation.

In step S316, the system control unit 200 determines whether the shutter button 102 has been fully pressed to turn on the second shutter switch 102b and then the second shutter switch signal SW2 has been generated, that is, whether a shooting instruction has been given. If the second shutter switch signal SW2 has not been generated, the process advances to step S317; otherwise, the process advances to step S319.

In step S317, the system control unit 200 determines whether halfway press of the shutter button 102 has been completed to turn off the first shutter switch 102a and then generation of the first shutter switch signal SW1 has stopped, that is, whether a shooting preparation instruction has been cancelled. If a shooting preparation instruction has been cancelled, the process advances to step S318; otherwise, the process returns to step S315.

In step S318, the system control unit 200 terminates the AF operation. Upon completion of the AF operation, the process returns to step S303.

In step S319, the system control unit 200 starts a series of shooting processing operations from an operation of reading out a signal from the image capturing unit 203 to an operation of writing image data in the recording medium 109. Note that the shooting processing will be referred to as actual shooting to discriminate it from shooting of a through-the lens-image. Upon performing actual shooting, the process returns to step S303.

In step S320, the system control unit 200 determines whether the menu button included in the operation units 104 has been pressed. That is, the unit 200 determines whether a menu switching instruction has been accepted. If it is determined that no menu switching instruction has been accepted, the process returns to step S303; otherwise, the process advances to step S321.

In step S321, the system control unit 200 changes the state of the camera 100 from a shooting state to a menu screen display state, and stores the state change in the system memory 211. Note that setting of the display mode of the shooting state is not changed at this time.

In step S322, the system control unit 200 displays a setting menu screen (not shown) on the display unit 101 according to the menu state setting stored in the system memory 211.

In step S323, the system control unit 200 determines whether the shutter button 102 has been pressed halfway to turn on the first shutter switch 102a and then the first shutter switch signal SW1 has been generated, that is, whether a shooting preparation instruction has been given. If the first shutter switch signal SW1 has not been generated, the process advances to step S328; otherwise, the process advances to step S324.

In step S324, the system control unit 200 determines whether the display mode state variable N is equal to the maximum value $N_{max}$. If the display mode state variable N is equal to the maximum value $N_{max}$, the process advances to step S325; otherwise, the process advances to step S327.

In step S325, the system control unit 200 determines whether an external finder has been attached to the attachment unit 112. This determination processing is similar to that described in step S312. If an external finder has been attached, the process advances to step S327; otherwise, the process advances to step S326.

In step S326, the system control unit 200 decrements the display mode state variable N by one. This processing is similar to that described in step S313.

In step S327, the system control unit 200 switches display of the display unit 101 from the menu screen to display in a display mode indicated by the current display mode state variable N. This processing switches display to that in display mode 3 if display was performed in display mode 4 before switching to the menu screen, and no external finder has been attached. Alternatively, if display was performed in display mode 4 before switching to the menu screen, and an external finder has been attached, display is performed in the display mode before switching to the menu screen. Even if display was performed in a display mode other than display mode 4 before switching to the menu screen, display is performed in the display mode before switching to the menu screen. After the processing in step S327, the process advances to step S315 described above.

In step S328, the system control unit 200 determines whether the menu button of the operation units 104 has been pressed and a menu switching instruction has been accepted. If it is determined that no menu switching instruction has been accepted, display of the menu screen continues, and the process returns to step S323. If a menu switching instruction has been accepted, the process advances to step S329, the display is switched to that in the display mode before switching to the menu screen (that is, the menu screen is closed), thereby returning to step S303.

With this processing, if a shooting preparation instruction is given in a display mode (display mode 4 in this embodiment) wherein no live view display is performed, the display mode is switched to that wherein live view display is performed, before executing a shooting preparation operation, thereby enabling the user to check an object before shooting.

Note that the process may advance to step S313 or S326 without determining the presence/absence of attachment of an external finder in step S312 or S325. If a shooting preparation instruction is given in display mode 4, the display mode may be switched to display mode 3 regardless of the presence/absence of attachment of a finder.

Note that a single item of hardware may control the system control unit 200, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to an image capturing apparatus such as a digital camera, the present invention is not limited to this example. The present invention is applicable to, for example, an apparatus by which display modes can be switched by an operation member. More specifically, the present invention is applicable to a mobile telephone terminal, a mobile image viewer, a digital photo frame, a music player, a game console, an electronic book reader, and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-131395, filed Jun. 8, 2012, which is hereby incorporated by reference herein in its entirety.

What is claimed is:

1. An image capturing apparatus comprising:
an image capturing unit;
a first acceptance unit configured to accept a display mode switching instruction from a user;
a display mode switching unit configured to switch, in response to the display mode switching instruction, to a next display mode in a predetermined order from a plurality of display modes including a first display mode wherein a live view image is displayed on a display unit, a second display mode, different from the first display mode, wherein a live view image is displayed on the display unit, and a third display mode wherein no live view image is displayed on the display unit;
a second acceptance unit configured to accept a shooting preparation instruction for performing a shooting preparation processing including at least one of an automatic focus processing, an automatic exposure processing, an automatic white balance processing and a flash pre-emission processing from a user; and
a control unit configured to control, in the predetermined order such that the display mode is switched to the first display mode from the third display mode, and when the display mode is the third display mode, (i) the display mode switching unit to switch the display mode from the third display mode to the first display mode upon accepting the display mode switching instruction from a user and (ii) the display mode switching unit to switch the display mode from the third display mode to the second display mode upon accepting the shooting preparation instruction from a user,
wherein the first display mode, the second display mode, and the third display mode are display modes in a shooting mode, and controls of switching from the third display mode to the first display mode and of switching from the third display mode to the second display mode are performed in the shooting mode.

2. The apparatus according to claim 1, wherein in the predetermined order, the third display mode follows the second display mode.

3. The apparatus according to claim 1, wherein the second display mode is a display mode wherein the number of items of information to be displayed is smallest among other display modes.

4. The apparatus according to claim 1, wherein if a finder different from the display unit has been attached, said control unit controls said display mode switching unit not to change the display mode even if the shooting preparation instruction is accepted in the third display mode.

5. The apparatus according to claim 1, wherein if the switching operation of said first acceptance unit is performed in the second display mode during recording of a moving image, said control unit controls said display mode switching unit to switch to the first display mode instead of the third display mode.

6. The apparatus according to claim 1, further comprising:
a display control unit configured to control to switch, in response to an operation of an operation unit, display of the display unit to another screen different from display in any of the plurality of display modes.

7. The apparatus according to claim 6, wherein upon accepting the shooting preparation instruction while the another screen is displayed after switching from display in a display mode other than the third display mode from the plurality of display modes to the another screen, said control unit controls said display mode switching unit to switch from the other screen to display in the display mode immediately before switching to the other screen.

8. The apparatus according to claim 7, wherein upon accepting the shooting preparation instruction while the other screen is displayed after switching from display in the third display mode to the other screen, said control unit controls said display mode switching unit to switch from the other screen to display in the second display mode.

9. The apparatus according to claim 6, wherein the other screen is a menu screen through which settings associated with said image capturing apparatus are made.

10. The apparatus according to claim 1, wherein said control unit controls to start autofocus processing in response to the shooting preparation instruction.

11. The apparatus according to claim 1, further comprising:
 a shooting processing unit configured to execute processing of causing, upon accepting a shooting instruction after accepting the shooting preparation instruction, said image capturing unit to capture an image, and storing the captured image in a recording medium.

12. A control method of an image capturing apparatus having an image capturing unit, a first acceptance unit configured to accept a display mode switching instruction from a user, and a second acceptance unit configured to accept a shooting preparation instruction for performing a shooting preparation processing including at least one of an automatic focus processing, an automatic exposure processing, an automatic white balance processing and a flash pre-emission processing from a user, the method comprising:
 switching, in response to the display mode switching instruction, to a next display mode in a predetermined order from a plurality of display modes including a first display mode wherein a live view image is displayed on a display unit, a second display mode, different from the first display mode, wherein a live view image is displayed on the display unit, and a third display mode wherein no live view image is displayed on the display unit,
 wherein in the mode switching, in the predetermined order such that the display mode is switched to the first display mode from the third display mode, and when the display mode is the third display mode, (i) switching the display mode from the third display mode to the first display mode upon accepting the display mode switching instruction from a user and (ii) the display mode is switched from the third display mode to the second display mode upon accepting the shooting preparation instruction from a user,
 wherein the first display mode, the second display mode, and the third display mode are display modes in a shooting mode, and controls of switching from the third display mode to the first display mode and of switching from the third display mode to the second display mode are performed in the shooting mode.

13. A non-transitory computer-readable storage medium storing a program for causing a computer to execute a control method of an image capturing apparatus having an image capturing unit, a first acceptance unit configured to accept a display mode switching instruction from a user, and a second acceptance unit configured to accept a shooting preparation instruction for performing a shooting preparation processing including at least one of an automatic focus processing, an automatic exposure processing, an automatic white balance processing and a flash pre-emission processing from a user, the method comprising:
 switching, in response to the display mode switching instruction, to a next display mode in a predetermined order from a plurality of display modes including a first display mode wherein a live view image is displayed on a display unit, a second display mode, different from the first display mode, wherein a live view image is displayed on the display unit, and a third display mode wherein no live view image is displayed on the display unit,
 wherein in the mode switching, in the predetermined order such that the display mode is switched to the first display mode from the third display mode, and when the display mode is the third display mode, (i) switching the display mode from the third display mode to the first display mode upon accepting the display mode switching instruction from a user and (ii) the display mode is switched from the third display mode to the second display mode upon accepting the shooting preparation instruction from a user,
 wherein the first display mode, the second display mode, and the third display mode are display modes in a shooting mode, and controls of switching from the third display mode to the first display mode and of switching from the third display mode to the second display mode are performed in the shooting mode.

* * * * *